United States Patent [19]

Näslund

[11] Patent Number: 5,090,839
[45] Date of Patent: Feb. 25, 1992

[54] SUPPORTING DEVICE FOR A STEERING MECHANISM

[75] Inventor: Ulf W. Näslund, Huskvarna, Sweden

[73] Assignee: Aktiebolaget Electrolux, Stockholm, Sweden

[21] Appl. No.: 518,085

[22] Filed: May 2, 1990

[30] Foreign Application Priority Data

Mar. 13, 1989 [SE] Sweden ................ 8900741

[51] Int. Cl.5 .......................... F16B 7/04
[52] U.S. Cl. .................. 403/391; 403/400; 403/59
[58] Field of Search ............ 403/391, 389, 396, 400, 403/98, 59, 61, 390, 388, 385

[56] References Cited

U.S. PATENT DOCUMENTS

| | | | |
|---|---|---|---|
| 1,198,186 | 9/1916 | Brown | 403/59 X |
| 2,575,917 | 11/1951 | Johnson | 403/59 |
| 2,754,156 | 7/1956 | Elderkin | 403/98 |
| 3,557,564 | 1/1971 | Hauber | 403/391 X |
| 4,175,298 | 11/1979 | Muller et al. | |
| 4,197,764 | 4/1980 | Auernhammer | 403/390 X |
| 4,566,819 | 1/1986 | Johnston | 403/400 X |
| 4,958,793 | 9/1990 | Hess | 403/391 X |

FOREIGN PATENT DOCUMENTS 2382317 9/1978 France .
327110 8/1970 Sweden .

Primary Examiner—Peter M. Cuomo
Attorney, Agent, or Firm—Pearne, Gordon, McCoy & Granger

[57] ABSTRACT

In a supporting device for the steering mechanism of a clearing saw it is possible to turn the steering mechanism from a working position to a transport position by securing the steering mechanism between two washers (15,16) provided with a cylindrical recess (17). The washers have oblong, arched grooves (21,22) penetrated by screws (19,20) threaded in the body (10) of the device.

3 Claims, 1 Drawing Sheet

SUPPORTING DEVICE FOR A STEERING MECHANISM

BACKGROUND OF THE INVENTION

The present invention relates to a supporting device for a steering mechanism of a so-called clearing saw or brush cutter provided with a drive shaft tube connecting a driving engine and a cutting tool. The steering mechanism is situated approximately in the middle of the drive shaft tube so that the clearing saw is balanced or weighs about evenly between the engine and the cutting tool, when carried by means of the supporting device.

The supporting device of clearing saws has heretofore been a screw connection between a handle bar and the drive shaft tube, where the steering mechanism is fastened in a determined, constant position. During transport and stowing in narrow spaces it is necessary to remove the steering mechanism in order to make the saw easy to handle. A steering mechanism having a pivoting holder and being adjustable in relation to the drive shaft tube is considered to entail advantages which improve the usability of the saw and facilitate the setting to each user or carrier individually.

SUMMARY OF THE INVENTION

The invention presents a flexible supporting device for the steering mechanism of a clearing saw offering the possibility of turning the handle bar in a horizontal plane as well as angling it in a vertical plane. In that way a simple adjustment can quickly be made between the working position of the steering mechanism and the transport position of it. In the working position it is easy to adjust the steering mechanism in the horizontal plane as well as in the vertical plane as to individual needs. A supporting device with those properties shall, with regard to the invention, be designed as more precisely stated in the characteristics described more fully hereinbelow.

BRIEF DESCRIPTION OF THE DRAWINGS

An embodiment of the supporting device according to the invention is described in the following with reference to the drawing enclosed, showing in FIG. 1 is a perspective picture of the arrangement in working position.

Figure 1:
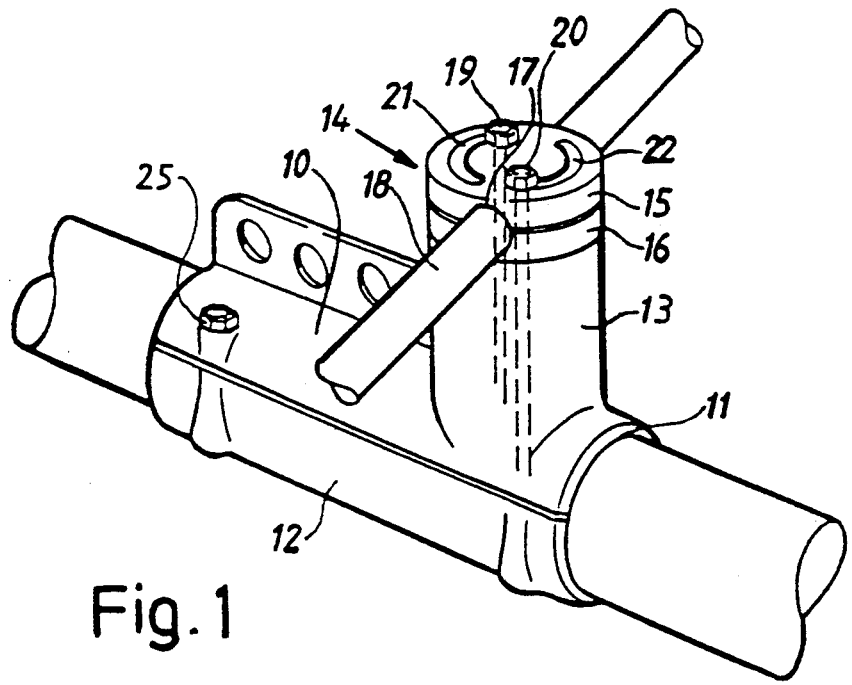

The arrangement which has been fastened to a drive shaft tube has a body 10 in which a semi-cylindrical recess 11 has been formed in order to fit against the drive shaft tube and a semi-cylindrical cover 12 completing said recess to a joint around the tube. In the body it also included a column 13 in the top of which there is a tube clamp 14 formed by two washers 15, 16 which have a cylindrical recess 17 between themselves giving space for a handle bar 18.

Figure 2:
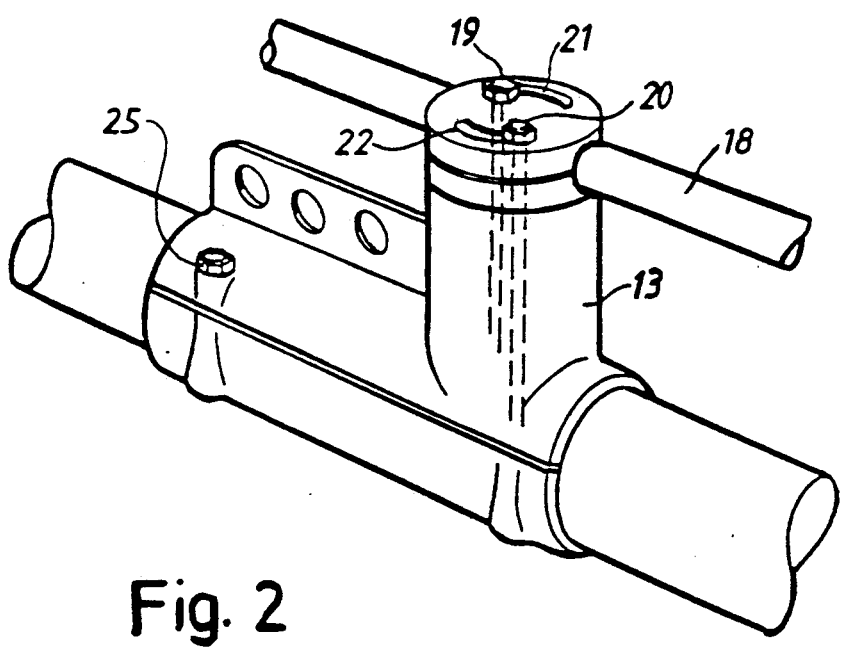
FIG. 2 is a perspective picture of the arrangement in transport position.

In FIG. 1 the handle bar is shown in right angle to the drive shaft tube, and it is constantly held in this position by the washers 15, 16 which are pressed against the column by two through screws 19,20 threaded in the cover 12. The screws penetrate oblong, arched slots or grooves 21,22 in the washers, which grooves make the washers displaceable in angular direction on the column 13, when the screws are untightened. Thanks to this angular displaceability, the whole tube clamp 14 with the handle bar 18 can be turned to the position in FIG. 2 which is the transport position of the steering mechanism.

In addition to said screws 19,20, two opposed screws 25 (only one shown in FIGS. 1 and 2) provide additional means for clamping body 10 and cover 12 together on said drive shaft tube. Such screws 25 (only one shown) allow said screw-connected portions 10,12 to remain clamped in a constant position on said drive shaft tube when screws 19,20 are untightened to allow the adjustment of handle bar 18.

Under special cross-country circumstances it can be advantageous to set the handle bar in an intermediate position between the two end positions shown. When the screws 19,20 are untightened, it is possible to set the steering mechanism in any angle between the end positions and then lock it in that position by means of the screws.

The adjustment of the handle bar also includes an angle setting in a vertical plane along the drive shaft tube. After having untightened the screws 19, 20 the handle bar can be arbitrarily angled in that plane and fastened by tightening the screws.

I claim:

1. In a supporting device for a handle bar (18) of a clearing saw provided with a drive shaft tube connecting a driving engine at one end of the tube to a cutting tool at the other end, where on portion of the device, shaped as a body having semi-cylindrical portions (10,12) surrounding the drive shaft tube, and a second portion, shaped as a column (13), carries a tube clamp (14) surrounding said handle bar (18), the improvement comprising a plurality of screws (19,20,25) for fastening the tube clamp in an arbitrary angle position on the column and the tube, at least one of said screws (19,20) securing together said semi-cylindrical portions (10,12), said tube clamp (14) including a pair of washers (15,16) each having a pair of oblong, arched slots, at least a pair of said screws extending through said arched slots of said washers, each of said washers having a semi-cylindrical recess (17) adapted to receive said handle bar.

2. Device according to claim 1, characterized in that the arched slots have ends limiting the adjustment of the angular position of the tube clamp in a plane between the clamp and the column, where one end corresponds to a working position of the handle bar and the other one to a transport position thereof.

3. Device according to claim 2, characterized in that the angle between the working position and the transport position is a right angle.

* * * * *